March 4, 1969   E. Y. FILATOV ET AL   3,430,502
MECHANISM CONVERTING TORSIONAL VIBRATION INTO LINEAR ONE
Filed July 20, 1967

United States Patent Office 3,430,502
Patented Mar. 4, 1969

3,430,502
MECHANISM CONVERTING TORSIONAL
VIBRATION INTO LINEAR ONE
Eduard Yakovlevich Filatov, Ulitsa Vernadskogo 59,
kv. 100, and Vadim Eduardovich Pavlovsky,
Vinogradny pereulok 8, kv. 6, both of Kiev,
U.S.S.R.
Filed July 20, 1967, Ser. No. 654,896
U.S. Cl. 74—89        2 Claims
Int. Cl. F16h 29/02

ABSTRACT OF THE DISCLOSURE

A device to change torsional vibration to axial vibration comprising two nested cylinders one end of the inner cylinder being connected to a chuck to hold the workpiece to which axial vibration is to be transmitted, and being constrained against rotation. The other end of this cylinder being secured to the adjacent end of the outer cylinder. The end of the outer cylinder that is nearest to the chuck being fixed to the machine, each of the cylinders being provided with parallel helical slits defining elastically deformable areas, the helical slits in the two cylinders having equal pitch but in opposite sense so that, as the ends of the cylinders that are secured together are oscillated the chuck is caused to vibrate axially.

---

The present invention relates to apparatus for conversion of mechanical vibrations and, more particularly, to mechanisms converting torsional vibrations into linear vibrations, such as those used in fatigue testing machines of the tension-compression type.

Fatigue testing machines are known, which comprise a generator of torsional vibrations and a mechanism for converting these torsional vibrations into linear vibrations, or reciprocation of a part gripping or otherwise holding the specimen under test, such mechanism including a bar mounted for reciprocation along a guideway and pivotally connected to the generator of torsional vibrations through connecting rod means.

However, in these known machines friction and lost motion in the pivotal connections of the constituent parts are responsible for considerable distortion of the main characteristics of the testing cycle and also for low stability of the value of loads cyclically applied to the specimen under test.

It is, therefore, the main object of the present invention to provide a vibration converting mechanism which ensures accurate and stable cyclic loading of the specimen under test.

With this and other objects in view, the inventors had for their aim the provision of a vibration converting mechanism which would be virtually free of play or lost motion in its motion transmitting train.

This and other aims are attained in a mechanism in which, according to the present invention, a motion transmitting and converting means is provided operatively connected between the generator of torsional vibrations and the part connected directly to the specimen under test, such motion transmitting and converting means comprising a hollow rotational body having slits in the central portion thereof, the slits being inclined at an angle to the longitudinal axis of the body and defining elastically deformable areas by means of which the axial length of the body varies with the torsional loads being applied thereto.

In a preferred embodiment of the present invention the said motion transmitting and converting means comprise two concentrically arranged cylindrical members of which one is received within the other, said cylindrical members being connected to one another at the respective ends thereof, said cylindrical members having helical slits formed in their central portions, said slits being substantially parallel to each other in each cylindrical member and spaced around the periphery of the respective cylindrical members, the slits in the two cylindrical members having their respective inclination or pitch angles substantially equal in value and opposite in their sense.

The present invention may be more readily understood from the following description of a preferred embodiment thereof, reference being had to the accompanying drawings, in which.

Figure 1:
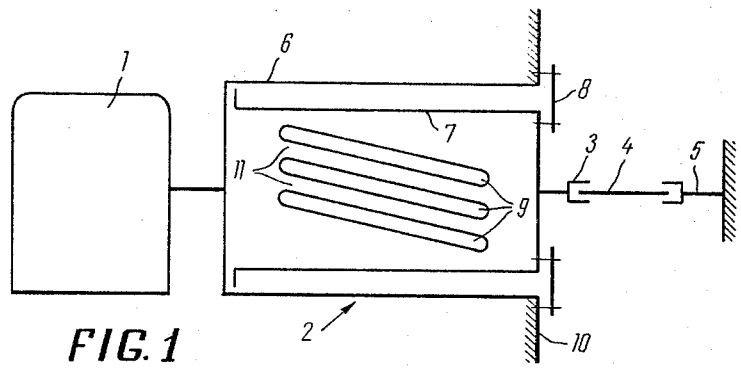
FIG. 1 shows diagrammatically the motion transmitting train of a fatigue testing machine comprising a vibration converting mechanism embodying the present invention.
Figure 2:
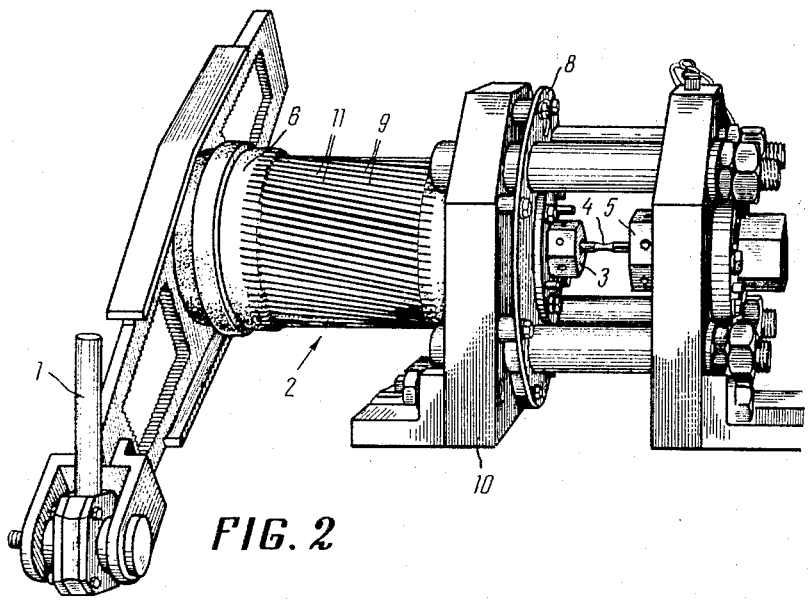
FIG. 2 is a diagrammatic general view of the mechanism shown in FIG. 1.

In the drawings, the generator 1 (FIGS. 1 and 2) of torsional vibrations is connected to one end of the motion transmitting and converting member 2, of which the other end is connected along the central axis of this member to the motion receiving member, i.e. the movable gripper 3 positively holding the test specimen 4.

In this preferred embodiment the vibration converting mechanism is employed in a fatigue testing machine (not shown) of the tension-compression type. The test specimen 4 is positively held between the movable gripper 3 and the stationary gripper 5.

The motion transmitting and converting member 2 includes two concentrically arranged cylinders 6 and 7, the cylinder 7 being received within the cylinder 6. The adjacent ends of the cylinders 6 and 7 on the side facing the vibration generator 1 are directly secured together, while the adjacent ends of these cylinders on the opposite side are connected by means of an annular flexible diaphragm 8.

Intermediate their ends the cylinders 6 and 7 have slits 9 formed therethrough, the slits 9 being spaced around the periphery of the cylinders and extending along helical lines. The inclination or pitch angle of these helical lines in relation to the longitudinal axis of the cylinders equals about 10°, with the slits in the cylinders 6 being parallel to each other and their inclination relative to the longitudinal axis of the cylinders being opposite to that of the slits in the cylinder 7, which latter are also parallel to each other.

In operation, when the generator 1 produces torsional vibrations which are applied to the end of the motion transmitting and converting member 2 facing the generator 1, the angular displacement of the opposite end of the cylinder 6 is restrained by the framework 10, while that of the opposite end of the cylinder 7 is restrained by the diaphragm 8, whereby the "spokes" 11 formed between the slits 9 bend, and the axial lengths of the cylinders 6 and 7 vary in accordance with this bending. With the cylinder 6 increasing its length, the cylinder 7 shortens, and the gripper 3 is displaced to tension the test specimen 4, while with the cylinder 6 shortening the cylinder 7 increases its length, whereby the test specimen 4 is subjected to a compression lead.

We claim:

1. A mechanism for converting torsional vibration into linear one, comprising: a generator of torsional vibration, a motion receiving member mounted for linear reciprocation, a motion transmitting and converting member operatively connected between said generator and said motion receiving member, said motion transmitting and converting member including at least one hollow body of rotation, said body having slits made through the side walls thereof, said slits being inclined in relation to the longitudinal axis of said body of rotation and defining elastically deformable areas, whereby when said motion transmitting and converting member is twisted about its axis by a torsional load applied thereto at one end by said generator, the other end being fixed against rotation, said elastically deformable areas effect variation of the axial length of said body of rotation.

2. A mechanism according to claim 1, in which said motion transmitting and converting member comprises two concentrically arranged nested cylinders having their respective adjacent end portions connected to each other, said two cylinders further each having substantially parallel slits formed therethrough intermediate their ends, said slits being spaced around the peripheries of their respective cylinders and extending along helical lines, the angles of inclination of said helical lines of said two cylinders relative to the longitudinal axis thereof being substantially equal in value and opposite in sense.

References Cited
UNITED STATES PATENTS

| | | | |
|---|---|---|---|
| 2,711,653 | 6/1955 | Zero | 74—25 |
| 3,004,439 | 10/1961 | Ross | 74—18.1 |
| 3,214,776 | 11/1965 | Bercovitz | 74—99 |

FRED C. MATTERN, Jr., *Primary Examiner.*

W. S. RATLIFFE, Jr., *Assistant Examiner.*